United States Patent
Wolf et al.

(10) Patent No.: US 11,425,666 B2
(45) Date of Patent: Aug. 23, 2022

(54) FAST DYNAMIC POWER CONTROL

(71) Applicant: QUALCOMM Incorporated, San Diego, CA (US)

(72) Inventors: Guy Wolf, Rosh Haayin (IL); Noam Zach, Kiryat Ono (IL); Sharon Levy, Binyamina (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/125,728

(22) Filed: Dec. 17, 2020

(65) Prior Publication Data

US 2021/0195535 A1 Jun. 24, 2021

Related U.S. Application Data

(60) Provisional application No. 62/951,902, filed on Dec. 20, 2019.

(51) Int. Cl.
| | |
|---|---|
| H04W 52/36 | (2009.01) |
| H04W 52/14 | (2009.01) |
| H04W 52/52 | (2009.01) |
| H04W 72/04 | (2009.01) |
| H04W 52/54 | (2009.01) |

(52) U.S. Cl.
CPC ......... *H04W 52/36* (2013.01); *H04W 52/143* (2013.01); *H04W 52/52* (2013.01); *H04W 52/54* (2013.01); *H04W 72/042* (2013.01)

(58) Field of Classification Search
CPC ..... H04W 52/36; H04W 52/52; H04W 52/14; H04W 52/54; H04W 72/042; H04W 52/143
USPC ..................... 455/522, 69, 452.1, 452.2, 509
See application file for complete search history.

(56) References Cited

U.S. PATENT DOCUMENTS

| | | | |
|---|---|---|---|
| 6,795,488 B1 * | 9/2004 | Iwakiri ................ | H04B 1/7117 375/148 |
| 2008/0318615 A1 * | 12/2008 | Ishii ..................... | H04W 52/265 455/522 |
| 2010/0304694 A1 * | 12/2010 | Suzuki .................. | H03F 1/3247 455/114.3 |

* cited by examiner

*Primary Examiner* — John J Lee
(74) *Attorney, Agent, or Firm* — Holland & Hart LLP

(57) ABSTRACT

Methods, systems, and devices for wireless communications are described. A transmitting device may determine a set of power adjustment values for a set of symbols to be used to transmit a data signal in a slot. In some cases, each power adjustment value corresponds to a power adjustment to be applied when transmitting a respective symbol in the slot. The transmitting device may transmit a control signal to a receiving device indicating the set of power adjustment values. The transmitting device may transmit the data signal on the set of symbols in the slot, applying the indicated set of power adjustment values to the set of symbols. The receiving device may decode the data signal based on the indicated set of power adjustments.

27 Claims, 14 Drawing Sheets

FAST DYNAMIC POWER CONTROL

CROSS REFERENCE

The present Application for Patent claims the benefit of U.S. Provisional Patent Application No. 62/951,902 by WOLF et al., entitled "FAST DYNAMIC POWER CONTROL," filed Dec. 20, 2019, assigned to the assignee hereof, and expressly incorporated by reference herein.

BACKGROUND

The present disclosure relates to wireless communications, and more specifically to fast dynamic power control.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A transmitting device in a wireless communications system may apply a transmit power to a signal to transmit the signal to a receiving device over a wireless channel. Some techniques for determining the transmit power for the signal can be improved.

SUMMARY

The described techniques relate to improved methods, systems, devices, and apparatuses that support fast dynamic power control. Generally, the described techniques provide for per-symbol transmit power adjustments. A device in a wireless communications system may apply a transmit power to a signal to transmit the signal over a wireless channel to a receiving device. The signal may be transmitted with a waveform, such as an orthogonal frequency division multiplexing (OFDM) waveform. The power input to a power amplifier to generate the signal may generally have a linear relationship to an output power of the power amplifier up until an input saturation power. When the input power exceeds the input saturation power, the efficiency of the power amplifier may quickly deteriorate, as the input-to-output relationship may become non-linear. To prevent the input power exceeding the input saturation power, the transmitting device may apply an input back off (IBO), lowering the input power to the power amplifier.

Devices in a wireless communications system described herein may implement techniques to support per-symbol power adjustments. For example, a transmitting device may determine per-symbol power adjustment values for symbols of a signal to be transmitted to a receiving device. A power adjustment value for a symbol may be based on a power headroom of the symbol, for example a difference between a peak transmit power of that symbol and a reference power (e.g., a peak transmit power of all symbols of the signal). The transmitter may pre-process the symbols of the transmission to meet a constant peak power over the transmitted symbols. The transmitting device may indicate the power adjustment values to the receiver, and the receiver may apply the power adjustment values to decode the signal. For example, the receiver may de-boost the symbols of the signal to coherently decode the signal. By applying a per-symbol transmission power adjustment, transmission power efficiency at the transmitter may be improved. By indicating the transmission power adjustments, a signal-to-noise ratio (SNR) at the receiver may also be improved.

A method of wireless communication at a transmitting device is described. The method may include determining a set of power adjustment values for a set of symbols to be used to transmit a data signal in a slot, transmitting a control signal indicating the set of power adjustment values, and transmitting the data signal on the set of symbols in the slot based on applying the indicated set of power adjustment values to the set of symbols.

An apparatus for wireless communication at a transmitting device is described. The apparatus may include a processor, memory coupled with the processor, and instructions stored in the memory. The instructions may be executable by the processor to cause the apparatus to determine a set of power adjustment values for a set of symbols to be used to transmit a data signal in a slot, transmit a control signal indicating the set of power adjustment values, and transmit the data signal on the set of symbols in the slot based on applying the indicated set of power adjustment values to the set of symbols.

Another apparatus for wireless communication at a transmitting device is described. The apparatus may include means for determining a set of power adjustment values for a set of symbols to be used to transmit a data signal in a slot, transmitting a control signal indicating the set of power adjustment values, and transmitting the data signal on the set of symbols in the slot based on applying the indicated set of power adjustment values to the set of symbols.

A non-transitory computer-readable medium storing code for wireless communication at a transmitting device is described. The code may include instructions executable by a processor to determine a set of power adjustment values for a set of symbols to be used to transmit a data signal in a slot, transmit a control signal indicating the set of power adjustment values, and transmit the data signal on the set of symbols in the slot based on applying the indicated set of power adjustment values to the set of symbols.

In some examples of the method, apparatuses, and non-transitory computer-readable medium described herein, transmitting the control signal further may include operations, features, means, or instructions for transmitting downlink control information indicating the set of power adjustment values.

In some examples of the method, apparatuses, and non-transitory computer-readable medium described herein, the downlink control information includes a grant of resources for the data signal.

In some examples of the method, apparatuses, and non-transitory computer-readable medium described herein, transmitting the control signal further may include operations, features, means, or instructions for transmitting uplink control information indicating the set of power adjustment values.

In some examples of the method, apparatuses, and non-transitory computer-readable medium described herein, each one power adjustment value of the set of power adjustment values corresponds to a power adjustment to be applied to a respective one symbol of the set of symbols in the slot.

In some examples of the method, apparatuses, and non-transitory computer-readable medium described herein, each one power adjustment value of the set of power adjustment values corresponds to a power adjustment to be applied to a respective subset of symbols of the set of symbols in the slot.

In some examples of the method, apparatuses, and non-transitory computer-readable medium described herein, each power adjustment value of the set of power adjustment values may be based on a difference between a reference value and, for the data signal on a symbol of the set of symbols, a peak-to-average power value, a peak power, or an average power.

In some examples of the method, apparatuses, and non-transitory computer-readable medium described herein, the reference value may be a maximum peak-to-average power value of the slot, a maximum peak power of the slot, or a maximum average power of the slot.

In some examples of the method, apparatuses, and non-transitory computer-readable medium described herein, the reference value may be based on a transmit power saturation value associated with one or more power amplifiers of the transmitting device.

In some examples of the method, apparatuses, and non-transitory computer-readable medium described herein, transmitting the data signal further may include operations, features, means, or instructions for applying the indicated set of power adjustment values to the set of symbols to transmit the data signal at a maximum allowed peak power of the transmitting device.

Some examples of the method, apparatuses, and non-transitory computer-readable medium described herein may further include operations, features, means, or instructions for combining the data signal with a peak-to-average power ratio reduction signal prior to transmitting the data signal.

In some examples of the method, apparatuses, and non-transitory computer-readable medium described herein, the transmitting device may be a user equipment (UE) or a base station.

A method of wireless communication at a receiving device is described. The method may include receiving a control signal indicating a set of power adjustment values for a set of symbols to be used for a data signal in a slot, receiving the data signal on the set of symbols in the slot, and decoding the received data signal based on applying the indicated set of power adjustment values to the set of symbols in the slot.

An apparatus for wireless communication at a receiving device is described. The apparatus may include a processor, memory coupled with the processor, and instructions stored in the memory. The instructions may be executable by the processor to cause the apparatus to receive a control signal indicating a set of power adjustment values for a set of symbols to be used for a data signal in a slot, receive the data signal on the set of symbols in the slot, and decode the received data signal based on applying the indicated set of power adjustment values to the set of symbols in the slot.

Another apparatus for wireless communication at a receiving device is described. The apparatus may include means for receiving a control signal indicating a set of power adjustment values for a set of symbols to be used for a data signal in a slot, receiving the data signal on the set of symbols in the slot, and decoding the received data signal based on applying the indicated set of power adjustment values to the set of symbols in the slot.

A non-transitory computer-readable medium storing code for wireless communication at a receiving device is described. The code may include instructions executable by a processor to receive a control signal indicating a set of power adjustment values for a set of symbols to be used for a data signal in a slot, receive the data signal on the set of symbols in the slot, and decode the received data signal based on applying the indicated set of power adjustment values to the set of symbols in the slot.

In some examples of the method, apparatuses, and non-transitory computer-readable medium described herein, receiving the control signal further may include operations, features, means, or instructions for receiving downlink control information indicating the set of power adjustment values.

In some examples of the method, apparatuses, and non-transitory computer-readable medium described herein, the downlink control information includes a grant of resources for the data signal.

In some examples of the method, apparatuses, and non-transitory computer-readable medium described herein, receiving the control signal further may include operations, features, means, or instructions for receiving uplink control information indicating the set of power adjustment values.

In some examples of the method, apparatuses, and non-transitory computer-readable medium described herein, each one power adjustment value of the set of power adjustment values corresponds to a power adjustment to be applied when decoding a respective one symbol of the set of symbols in the slot.

In some examples of the method, apparatuses, and non-transitory computer-readable medium described herein, each one power adjustment value of the set of power adjustment values corresponds to a power adjustment to be applied when decoding a respective subset of symbols of the set of symbols in the slot.

In some examples of the method, apparatuses, and non-transitory computer-readable medium described herein, each power adjustment value of the set of power adjustment values may be based on a difference between a reference value and, for the data signal on a symbol of the set of symbols, a peak-to-average power value, a peak power, or an average power.

In some examples of the method, apparatuses, and non-transitory computer-readable medium described herein, the reference value may be a maximum peak-to-average power value of the slot, a maximum peak power of the slot, or a maximum average power of the slot.

In some examples of the method, apparatuses, and non-transitory computer-readable medium described herein, the reference value may be based on a transmit power saturation value associated with one or more power amplifiers of the transmitting device.

In some examples of the method, apparatuses, and non-transitory computer-readable medium described herein, receiving the data signal further may include operations, features, means, or instructions for applying the indicated set of power adjustment values to the set of symbols to decode the data signal at a maximum allowed peak power of the transmitting device.

In some examples of the method, apparatuses, and non-transitory computer-readable medium described herein, the data signal may be decoded based on the data signal being combined with a peak-to-average power ratio reduction signal.

In some examples of the method, apparatuses, and non-transitory computer-readable medium described herein, the receiving device may be a UE or a base station.

DETAILED DESCRIPTION

Figure 1:
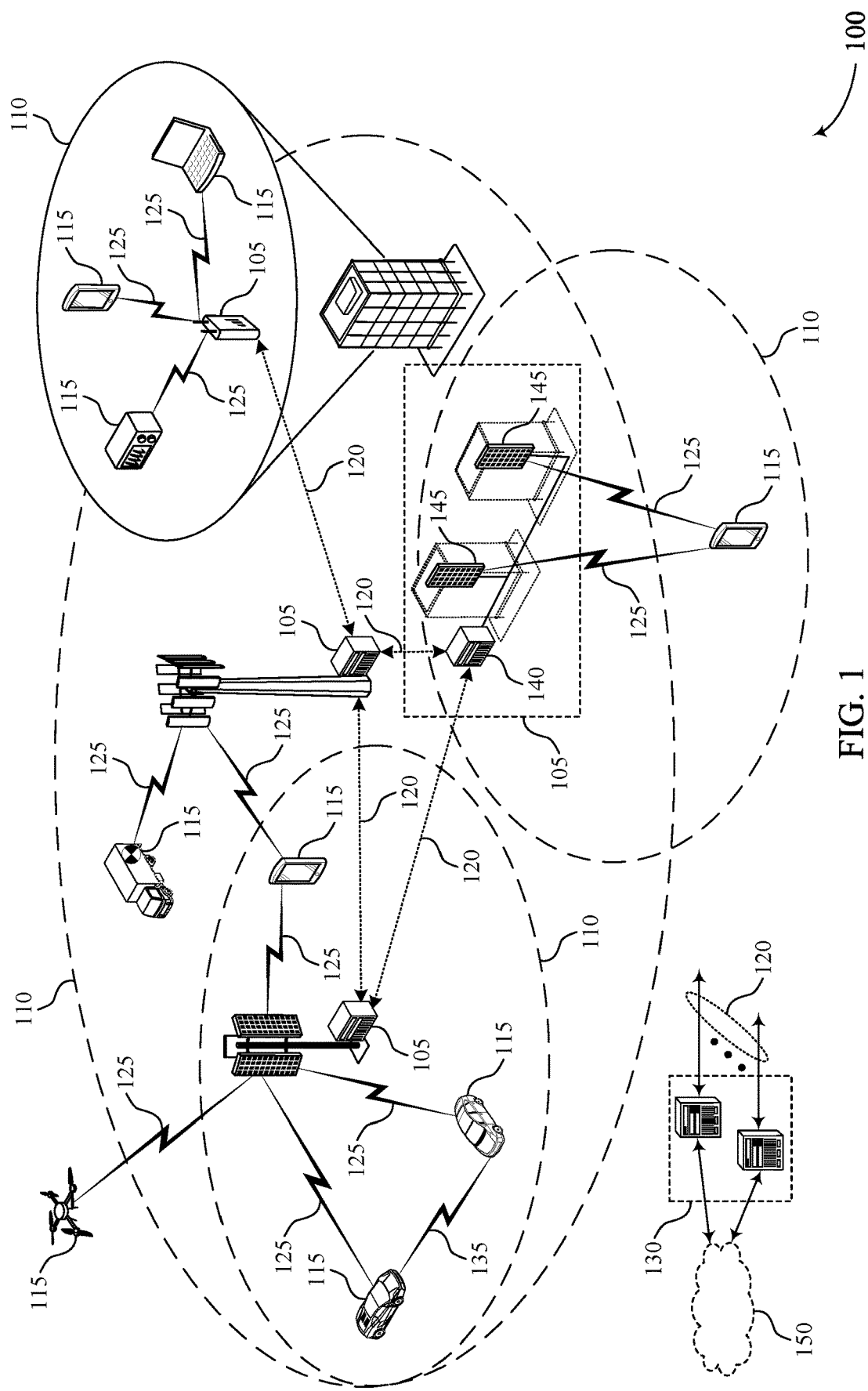
FIG. 1 illustrates an example of a system for wireless communications that supports fast dynamic power control in accordance with aspects of the present disclosure.

A device in a wireless communications system may apply a transmit power to a signal to transmit the signal over a wireless channel to a receiving device. The signal may be transmitted with a waveform, such as an orthogonal frequency division multiplexing (OFDM) waveform. The power input to a power amplifier to generate the signal may generally have a linear relationship to an output power of the power amplifier up until an input saturation power. When the input power exceeds the input saturation power, the efficiency of the power amplifier may quickly deteriorate. To prevent the input power exceeding the input saturation power, the transmitting device may apply an input back off (IBO), lowering the input power to the power amplifier. However, the power amplifier may be most efficient with an input power close to (e.g., but not over) the input power saturation. Therefore, applying too large of an input back off may also reduce the efficiency of the transmitting device.

In some cases, the amount of back off applied for a signal may be based on a peak-to-average power ratio (PAPR) of the signal. Therefore, some systems support techniques to reduce PAPR, thereby improving efficiency for the transmitter. Some techniques for PAPR reduction may be based on a worst-case PAPR for the signal. However, the PAPR and peak power of the signal may vary per-symbol. For example, the first symbol of a signal may have the highest peak power, larger than the other symbols of the signal. IBO based on the PAPR of the first symbol may be applied to the entire signal, but this IBO may be too much for other symbols of the signal, as the other symbols may not have the same peak power.

Devices in a wireless communications system described herein may implement techniques to support per-symbol power adjustments. For example, a transmitting device may determine per-symbol power adjustment values for symbols of a signal to be transmitted to a receiving device. A power adjustment value for a symbol may be a power headroom of the symbol, for example a difference between a peak transmit power of that symbol and a reference power (e.g., a peak transmit power of all symbols of the signal). The transmitter may pre-process the symbols of the transmission to meet a constant peak power over the transmitted symbols. The transmitting device may indicate the power adjustment values to the receiver, and the receiver may apply the power adjustment values to decode the signal. For example, the receiver may de-boost the symbols of the signal to coherently decode the signal. By applying a per-symbol transmission power adjustment, transmission power efficiency at the transmitter may be improved. By indicating the transmission power adjustments, a signal-to-noise ratio (SNR) at the receiver may also be improved.

Aspects of the disclosure are initially described in the context of a wireless communications system. Aspects of the disclosure are further illustrated by and described with reference to apparatus diagrams, system diagrams, and flowcharts that relate to fast dynamic power control.

FIG. 1 illustrates an example of a wireless communications system 100 that supports early indication of new radio-light dedicated system information in accordance with aspects of the present disclosure. The wireless communications system 100 may include one or more base stations 105, one or more user equipments (UEs) 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Devices in a wireless communications system described herein may implement techniques to support per-symbol power adjustments. For example, a transmitting device, such as a base station 105 or a UE 115, may determine per-symbol power adjustment values for symbols of a signal to be transmitted to a receiving device. A power adjustment value for a symbol may be a power headroom of the symbol, for example a difference between a peak transmit power of that symbol and a reference power (e.g., a peak transmit power of all symbols of the signal). The transmitter may pre-process the symbols of the transmission to meet a constant peak power over the transmitted symbols. The transmitting device may indicate the power adjustment values to the receiver, and the receiver may apply the power adjustment values to decode the signal. For example, the receiver may de-boost the symbols of the signal to coherently decode the signal. By applying a per-symbol transmission power adjustment, transmission power efficiency at the transmitter may be improved. By indicating the transmission power adjustments, an SNR at the receiver may also be improved.

Figure 2:
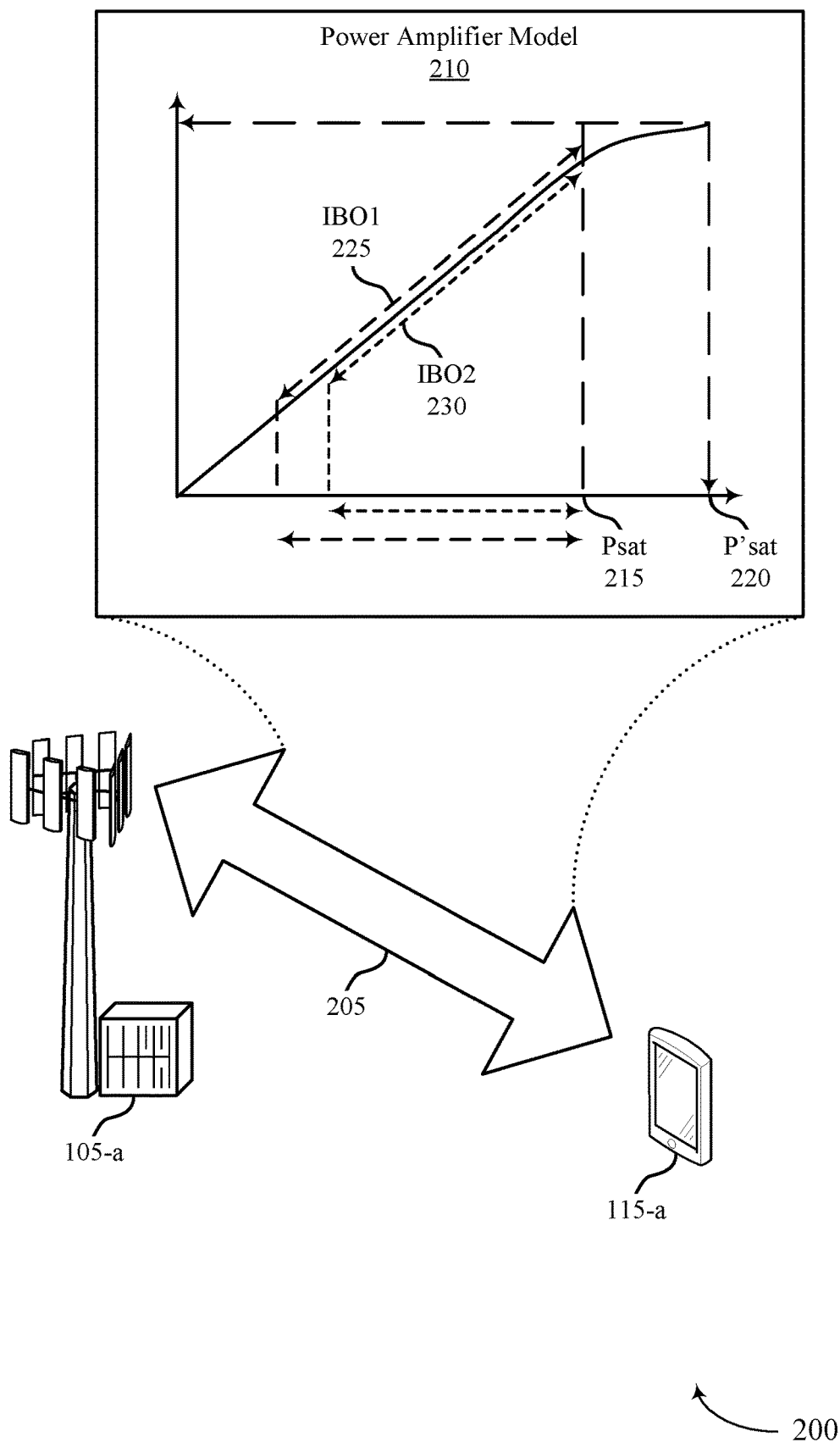
FIG. 2 illustrates an example of a wireless communications system that supports fast dynamic power control in accordance with aspects of the present disclosure.

FIG. 2 illustrates an example of a wireless communications system 200 that supports fast dynamic power control in accordance with aspects of the present disclosure. In some examples, the wireless communications system 200 may implement aspects of wireless communications system 100. The wireless communications system 200 may include UE 115-a and base station 105-a, which may be respective examples of a UE 115 and a base station 105 as described with reference to FIG. 1. UE 115-a and base station 105-a may have an established wireless link 205, where UE 115-a may transmit to base station 105-a on an uplink channel of the established wireless link 205, or base station 105-a may transmit to UE 115-a on a downlink channel of the established wireless link 205.

A transmitting device in the wireless communications system 200 may apply a transmit power to a signal to send the signal over a wireless channel to a receiving device. For example, for a downlink transmission, base station 105-a may transmit a signal on a downlink channel with a certain transmit power to UE 115-a. In some cases, the signals may be transmitted with a waveform such as an OFDM waveform.

A power amplifier model 210 may show an example relationship between an input power to generate a signal and an output power of the signal at a transmitter. With a low input power, the relationship between the input power and the output power may be linear.

However, when the input power exceeds an input saturation power 215 (e.g., $P_{SAT}$), the power amplifier model 210 may not be linear and become less efficient. For example, there may be a dropoff between input power and output power past the input saturation power 215. To prevent the transmitter from operating past the input saturation power 215, the transmitter may apply an IBO 230. Generally, the closer the input power is to the input saturation power 215 without exceeding the input saturation power 215, the higher the efficiency of the power amplifier. Therefore, it may be beneficial for a transmitter to apply a power as close to the input saturation power 215 as possible without exceeding the input saturation power 215 and triggering the IBO 220.

The transmitted power, $P_s$, of the power amplifier model 210 may be characterized by Equation (1) below, where $P_{SAT}$ is the input saturation, IBO is the input back-off used at the power amplifier input to avoid $P_{SAT}$. The saturation power, $P_{SAT}$, may be characterized by the power amplifier transmission, and $E\{|s(t)|^2\}$ may be the power of the transmitted signal (e.g., calculated based on long terms expectations of the second order statistics of the signal).

$$P_s = E\{|s(t)|^2\}10^{(\frac{P_{SAT}-IBO}{10})} \quad (1)$$

Some waveforms may be considered inefficient for a transmitter, as the transmitter may implement a significant IBO at the power amplifier to avoid sample saturation. For example, with OFDM signals, the PAPR may reach large values, and the input power back-off considered may be $IBO_1 = PAPR_{OFDM} \approx 11$ dB.

Some wireless communications systems support schemes for reducing PAPR. The transmitter may then boost the signal or otherwise benefit from operating at a more efficient working point at the power amplifier input. For example, some techniques for boosting the input power may provide better efficiency and less input dynamic range at the power amplifier input. In some cases, some schemes may support using a smaller IBO (e.g., using IBO 230 instead of IBO 220), which may improve power efficiency without degrading the signal.

Some schemes for PAPR reduction may generally be based on a worst case PAPR (e.g., a maximum PAPR) experienced at the power amplifier. For example, IBO may consider a worst-case PAPR measured of all OFDM symbols (e.g., corresponding to OFDM symbol s) in a set of S symbols, where $$IBO_S = \max_{s \in S}(PAPR_S).$$

In some cases, the transmitting device may apply the IBO based on the worst-case PAPR for the entire transmission.

However, considering the maximum PAPR for the set of symbols may have some inefficiencies. For example, backoff applied based on the maximum PAPR may be too much of a backoff for other symbols where the PAPR did not reach the maximum expected PAPR. This may lead to some power inefficiencies for symbols where the PAPR is not the maximum PAPR, as the power for these symbols may be lower (e.g., and farther away from $P_{SAT}$).

The techniques described herein support per-symbol power boosting at a transmitter. By applying a per-symbol power boost, the overall power efficiency for a transmission may be improved, as the transmitter may maintain the transmit power at a constant peak (e.g., at $P_{SAT}$). Therefore, the IBO which may be applied based on the worst-case PAPR for a set of symbols may be compensated on a per-symbol basis, such that the transmit power for each symbol of the set of symbols is transmitted at a power which is much closer to $P_{SAT}$. This enables the system to optimize the transmit power to the maximum value allowed while reaching the maximum allowed peak power (e.g., $P_{SAT}$) for all transmitted OFDM symbols. These techniques may provide significant performance improvement for the transmit power additions and provide enhanced SNR for the receiver.

The transmitter may determine per-symbol power boosting values for each symbol of a transmission. The transmitter may boost the power of the signal in symbol s by the ratio of the maximum PAPR to the PAPR of symbol s, such that the power of symbol s, $P_s$, is given by Equation (2) below. The power boosting value, $\alpha_s$, may be given by Equation (3) below.

$$P_s = \alpha_s E\{|s(t)|^2\} \quad (2)$$

$$\alpha_s 10^{\{\frac{P_{SAT}-IBO_S}{10}\}} = 10^{\{\frac{P_{SAT}-(\max_{s \in S}[PAPR_s - PAPR_s])}{10}\}} \quad (3)$$

This may allow the system to optimize the transmit power to a maximum value allowed while reaching the maximum allowed peak power (e.g., $P_{SAT}$) for the transmitted OFDM symbols. The additional power gain may have significant performance improvements for the transmit power and provide additional improvements for the SNR of the receiver.

The transmitter may then indicate the power boosting values to a receiver to assist the receiver in coherently decoding the power boosted transmission. For example, the indication of the power boosting values may be sent to the receiver on a control channel.

In an example, base station 105-a may be the transmitter, and base station 105-a may determine power boosting values for a transmission spanning a slot. Base station 105-a may determine power boosting values (e.g., α values) for each symbol of the slot, and base station 105-a may transmit an indication of the power boosting values to UE 115-a. In some cases, the power boosting values may be indicated via downlink control information. Base station 105-a may transmit the signal, applying the power boosts to their corresponding symbols when transmitting. UE 115-a may identify the power boosting values and decode each symbol of the transmission based on applying the power boosting values when decoding. In other examples, UE 115-a may be the transmitter, and base station 105-a may be the receiver.

In some cases, the techniques described herein, such as per-symbol power boosting, may be applied with other PAPR reduction techniques. For example, in some other PAPR reduction schemes (e.g., tone reservation, null space transmission, etc.), a signal may be added to the desired waveform to minimize the waveform's per-element PAPR. Based on adding the signal, the level of the desired waveform allocated to the receiver may vary (e.g., depending on the statistics of the signal, per-symbol PAPR optimization result, and the overall power constraints at the transmitter power amplifier input). To avoid unnecessary back off based on the power variation, the dynamic per-symbol boosting may be applied for these other PAPR reduction techniques, providing further performance advantages for the receiver. Therefore, the techniques described herein may also be supported for schemes which consider the average transmitter power constraints (e.g., in addition to, or as an alternative to, schemes which consider the maximum or minimum power constraints). As an example, techniques described herein may be supported for schemes which determine the power constraint, P, based on Equation (4) below, where $P_{user}$ is the desired signal and $P_{PAPR}$ is a PAPR reduction signal.

$$P = \alpha_s P_{user} + (1-\alpha_s) P_{PAPR} \quad (4)$$

Figure 3:
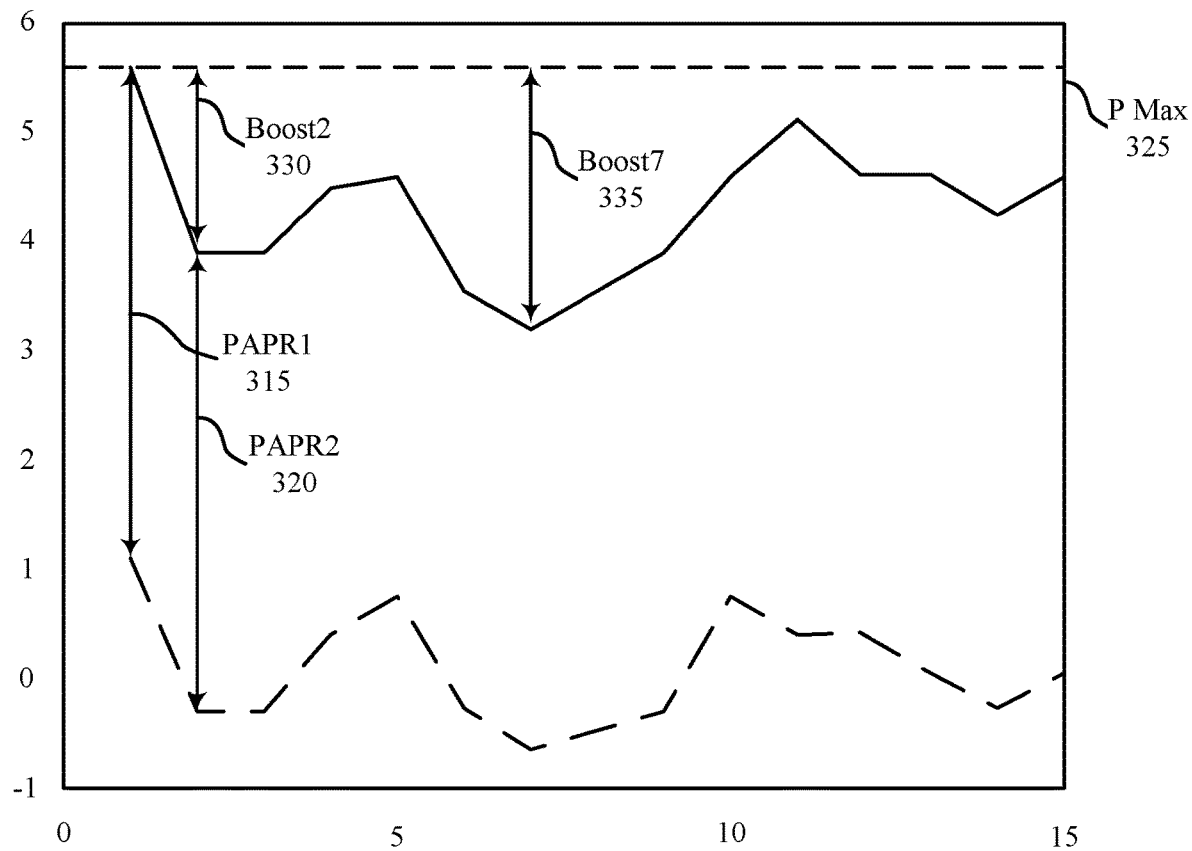
FIG. 3 illustrates an example of a per-symbol power boost scheme that supports fast dynamic power control in accordance with aspects of the present disclosure.

FIG. 3 illustrates an example of a per-symbol power boost scheme 300 that supports fast dynamic power control in accordance with aspects of the present disclosure. In some examples, per-symbol power boost scheme 300 may implement aspects of wireless communications system 100.

A transmitter may apply a power boost to each symbol of a transmission based on a power headroom for each symbol. The per-symbol power boost scheme 300 shows an example of a transmission spanning a slot. The per-symbol power boost scheme 300 shows a peak power 305 per symbol and an average power 310 per symbol, where a difference between the peak power 305 per symbol and the average power 310 per symbol corresponds to a PAPR for each symbol. For example, PAPR1 315 may correspond to a first symbol of the slot, and PAPR2 320 may correspond to a second symbol for the slot.

Each symbol may have a different peak power 305. The peak power 305 for every symbol may not reach a peak power 325 (e.g., $P_{Max}$) allowed for the transmission. In some cases, the peak power 305 may be based on a saturation power (e.g., $P_{SAT}$), a highest peak power of a symbol of a transmission, a maximum power supported by a transmitter, a maximum PAPR value, an average PAPR value, or another reference power. In this example, the first symbol of the slot may have the highest power (e.g., which may be the peak power 325 or a fixed saturation point at the transmitter).

Based on the peak power and PAPR varying from symbol to symbol, an IBO which is determined based on the peak power of the slot may decrease overall transmit efficiency for the transmitter. For example, the transmitter may back off the transmit power too much for the symbols of the slot which do not reach the peak power 325.

A transmitting wireless device described herein may apply a per-symbol power boost to meet a constant peak power over all transmitted symbols. The transmitting device may pre-process the transmitted slot and indicate the power corrections to the receiving device. In some cases, each power adjustment value of the set may correspond to a power adjustment to be applied to a respective symbol in the slot. The power boost value for a symbol may be based on a ratio of the maximum PAPR (e.g., of symbols in the transmission) to the PAPR of that symbol. In some cases, the reference value may be a maximum peak-to-average power value of the slot, a maximum peak power of the slot, or a maximum average power of the slot. In some cases, the reference value is based on a transmit power saturation value associated with one or more power amplifiers of the transmitting device.

In an example, for a second symbol of the signal, the transmitting device may apply boost2 330 to the symbol and raise the transmission power to meet the peak power 325. Boost2 330 may be determined based on a difference between the peak power 325 and a peak power 305 for symbol 2. Similarly, the transmitter may apply boost7 335 to the seventh symbol of the signal to increase the peak power 305 for the seventh symbol to the peak power 325.

Thus, a transmitter in a system implementing the techniques described herein may apply per-symbol power adjustments to a signal. The power adjustments may be signaled or indicated by the transmitter to the receiver, and the receiver may use the indicated power adjustments to compensate for the power adjustments applied to the signal. Generally, examples herein have described the power adjustments as power boosts. However, in some other examples, the power adjustments may include transmit power boosts, transmit power reductions, or a combination thereof.

Figure 4:
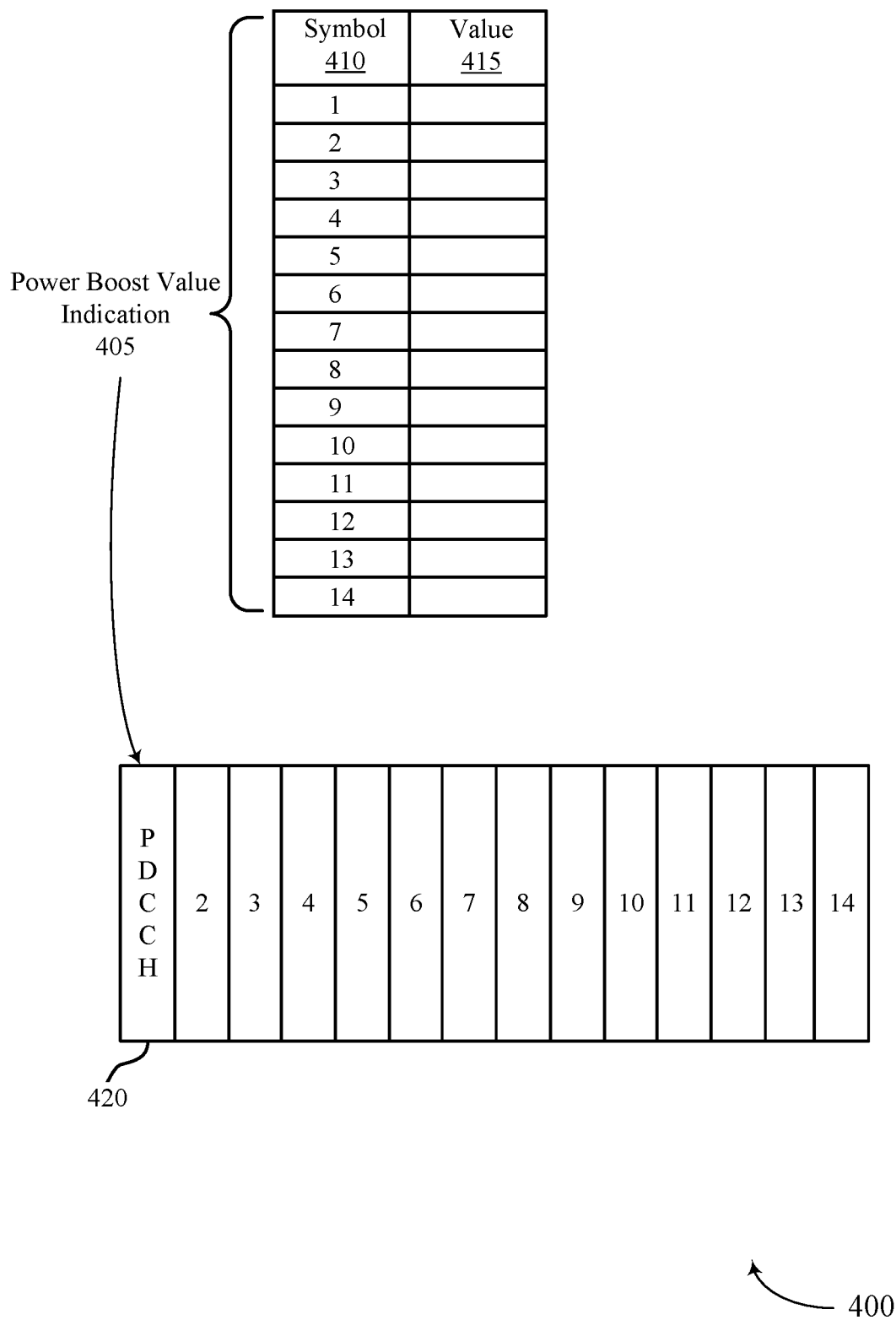
FIG. 4 illustrates an example of a power adjustment indication scheme that supports fast dynamic power control in accordance with aspects of the present disclosure.

FIG. 4 illustrates an example of a power adjustment indication scheme 400 that supports fast dynamic power control in accordance with aspects of the present disclosure. In some examples, the power adjustment indication scheme 400 may implement aspects of wireless communications system 100.

A transmitter may apply per-symbol power adjustments to symbols of a transmission and indicate the power adjustments to a receiver to assist the receiver in decoding the transmission. For example, the transmitter may send a power boost value indication 405.

The power boost value indication 405 may include one or more power boost values applied to transmit a signal. The power boost values may indicate, for a set of symbols of the signal, a power adjustment (e.g., an α value) applied by a transmitter when transmitting the set of symbols. In some cases, the power adjustments may be applied on a per-symbol basis. For example, the power boost value indication 405 may include a power adjustment value 415 for each symbol 410 of the signal. If the signal is transmitted during a slot, then the power boost value indication 405 may include a power adjustment value 415 for each symbol of the slot. For example, symbol 1 may have a first power adjustment value 415, symbol 2 may have a second power adjustment value 415, etc.

The transmitter may send the power boost value indication 405 on a control channel to the receiver. In an example, a base station 105 may be the transmitter, and the base station 105 may transmit the power boost value indication 405 on a downlink control channel 420 to a UE 115. In another example, a UE 115 may be the transmitter, and the UE 115 may transmit the power boost value indication 405 to a base station 105 on an uplink control channel. These techniques may be applied for other wireless communications schemes as well, such as D2D or IoT. For example, the power boost value indication 405 may be sent by a transmitter on a control channel for the D2D or IoT wireless communications system.

The receiver may receive the power boost value indication 405 on the control channel and decode the signal accordingly. For example, the receiver may decode the signal based on the per-symbol power adjustment values 415, which may assist the receiver in coherently decoding the signal. In an example, the receiver may de-boost the per-symbol power factor before decoding.

Figure 5:
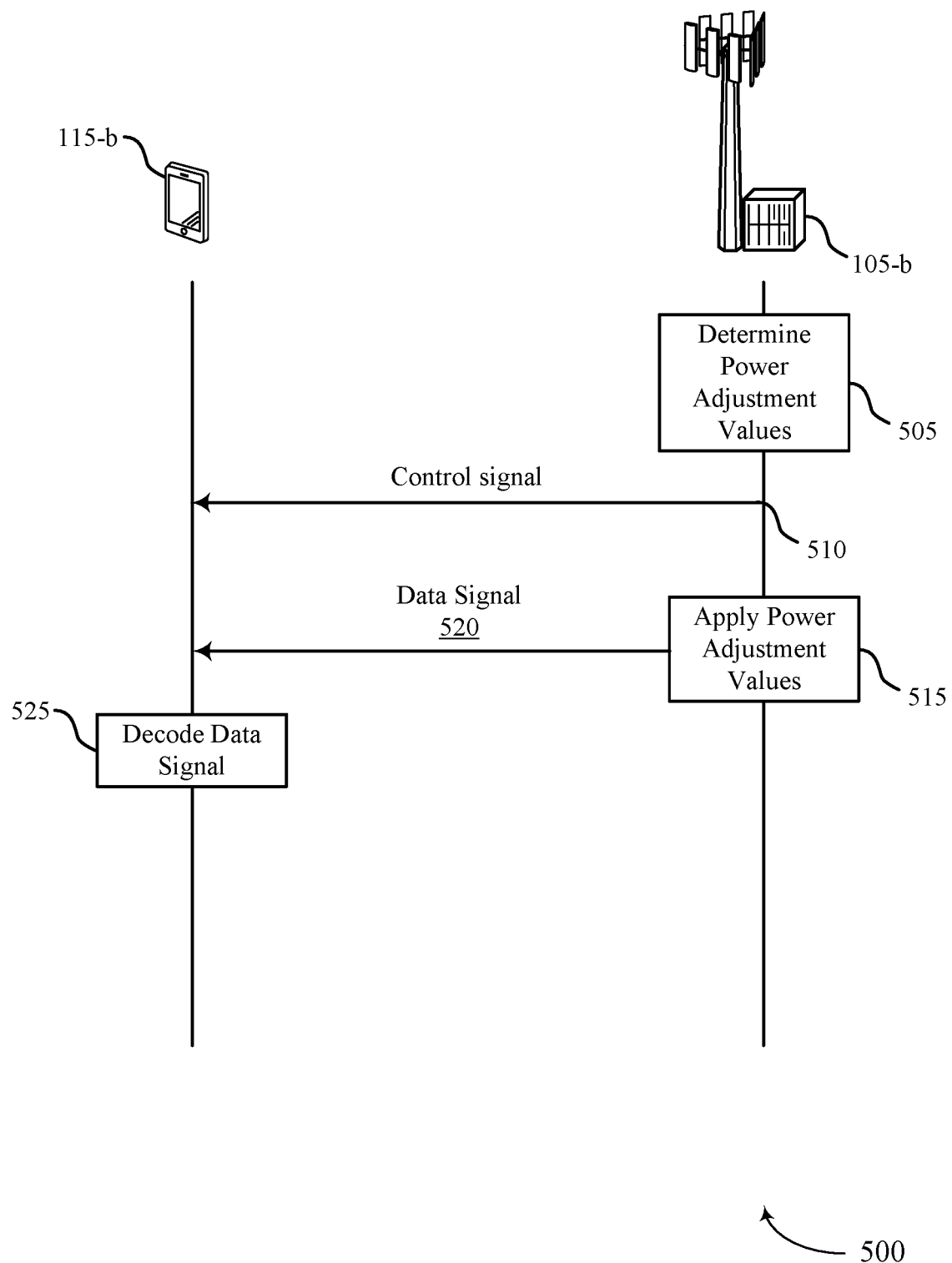
FIG. 5 illustrates an example of a process flow that supports fast dynamic power control in accordance with aspects of the present disclosure.

FIG. 5 illustrates an example of a process flow 500 that supports fast dynamic power control in accordance with aspects of the present disclosure. In some examples, process flow 500 may implement aspects of wireless communications system 100. The process flow 500 may include UE 115-*b* and base station 105-*b*, which may be examples of a UE 115 and a base station 105 as described with reference to FIGS. 1 and 2. In the example of process flow 500, base station 105-*b* may be an example of a transmitter as described herein, and UE 115-*b* may be an example of a receiver as described herein. In other example, UE 115-*b* may be an example of the transmitter, and base station 105-*b* may be an example of the receiver.

At 505, the transmitting device (e.g., base station 105-*b*) may determine a set of power adjustment values for a set of symbols to be used to transmit a data signal in a slot. In some cases, each power adjustment value based on a difference between a reference value and a peak-to-average power value for the data signal in a symbol of the set of symbols. In some examples, the reference value may be a maximum PAPR value of the slot, a maximum peak power of the slot, or a maximum average power of the slot.

At 510, the transmitting device may transmit a control signal indicating the set of power adjustment values. For example, base station 105-*b* may transmit the set of power adjustment values on a downlink control channel to UE 115-*b*.

The transmitting device may apply the set of power adjustment values to corresponding symbols of the data signal at 515. At 520, the transmitting device may transmit the data signal on the set of symbols in the slot based on applying the indicated set of power adjustment values to the set of symbols. In some cases, each symbol of the data signal may have a corresponding power adjustment value, and the transmitting device may apply each power adjustment for the corresponding symbol.

The receiving device (e.g., UE 115-*b*) may receive the control signal indicating the set of power adjustment values and receive the data signal on the set of symbols in the slot. The receiving device may de-boost the per-symbol power adjustment before decoding the data signal. At 525, the receiving device will decode the received data signal based on applying the indicated set of power adjustment values to the set of symbols in the slot. In some cases, applying the power adjustment values to the set of symbols may assist the receiving device in coherently decoding the data signal.

Figure 6:
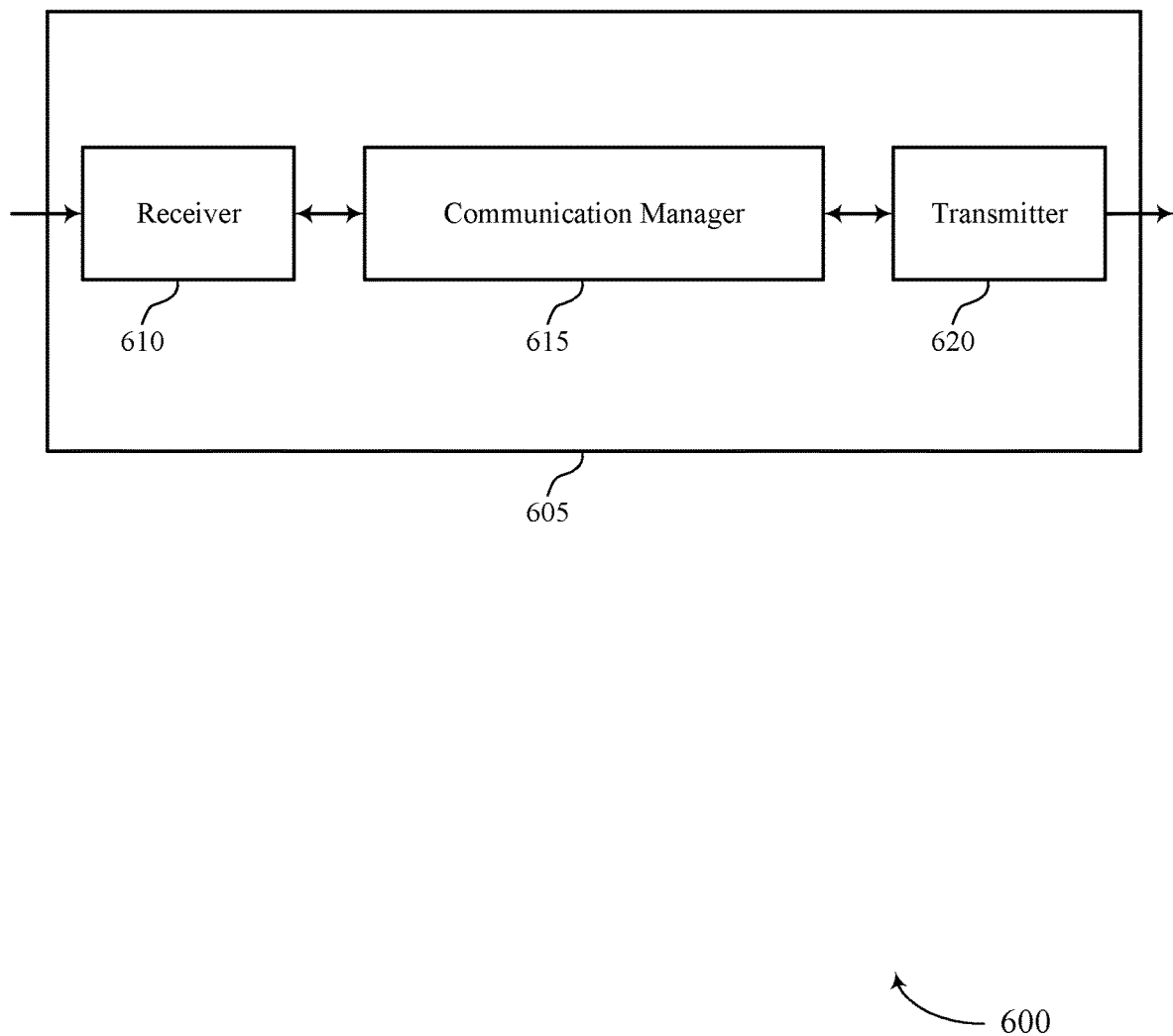
FIGS. 6 and 7 show block diagrams of devices that support fast dynamic power control in accordance with aspects of the present disclosure.

FIG. 6 shows a block diagram 600 of a device 605 that supports fast dynamic power control in accordance with aspects of the present disclosure. The device 605 may be an example of aspects of a UE 115 or base station 105 as described herein. The device 605 may include a receiver 610, a communication manager 615, and a transmitter 620. The device 605 one or more processors, memory coupled with the one or more processors, and instructions stored in the memory that are executable by the one or more processors to enable the one or more processors to perform the per-symbol power boosting features discussed herein. Each of these components may be in communication with one another (e.g., via one or more buses).

The receiver 610 may receive information such as packets, user data, or control information associated with various information channels (e.g., control channels, data channels, and information related to fast dynamic power control, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may determine a set of power adjustment values for a set of symbols to be used to transmit a data signal in a slot, transmit a control signal indicating the set of power adjustment values, and transmit the data signal on the set of symbols in the slot based on applying the indicated set of power adjustment values to the set of symbols. The communication manager 615 may also receive a control signal indicating a set of power adjustment values for a set of symbols to be used for a data signal in a slot, receive the data signal on the set of symbols in the slot, and decode the received data signal based on applying the indicated set of power adjustment values to the set of symbols in the slot. The communication manager 615 may be an example of aspects of the communication manager 910 or 1010 as described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communication manager 615 as described herein may be implemented to realize one or more potential advantages. One implementation may allow a transmitting device (e.g., a UE 115 or a base station 105) to improve transmit power efficiency by maintain a transmit power for each symbol of a transmission at a constant peak power. Additionally or alternatively, a receiving device (e.g., a UE 115 or a base station 105) may realize one or more potential advantages such as by providing improved SNR for the power-boosted signal. In some cases, the techniques described herein may optimize a downlink link budget for a base station.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

Figure 7:
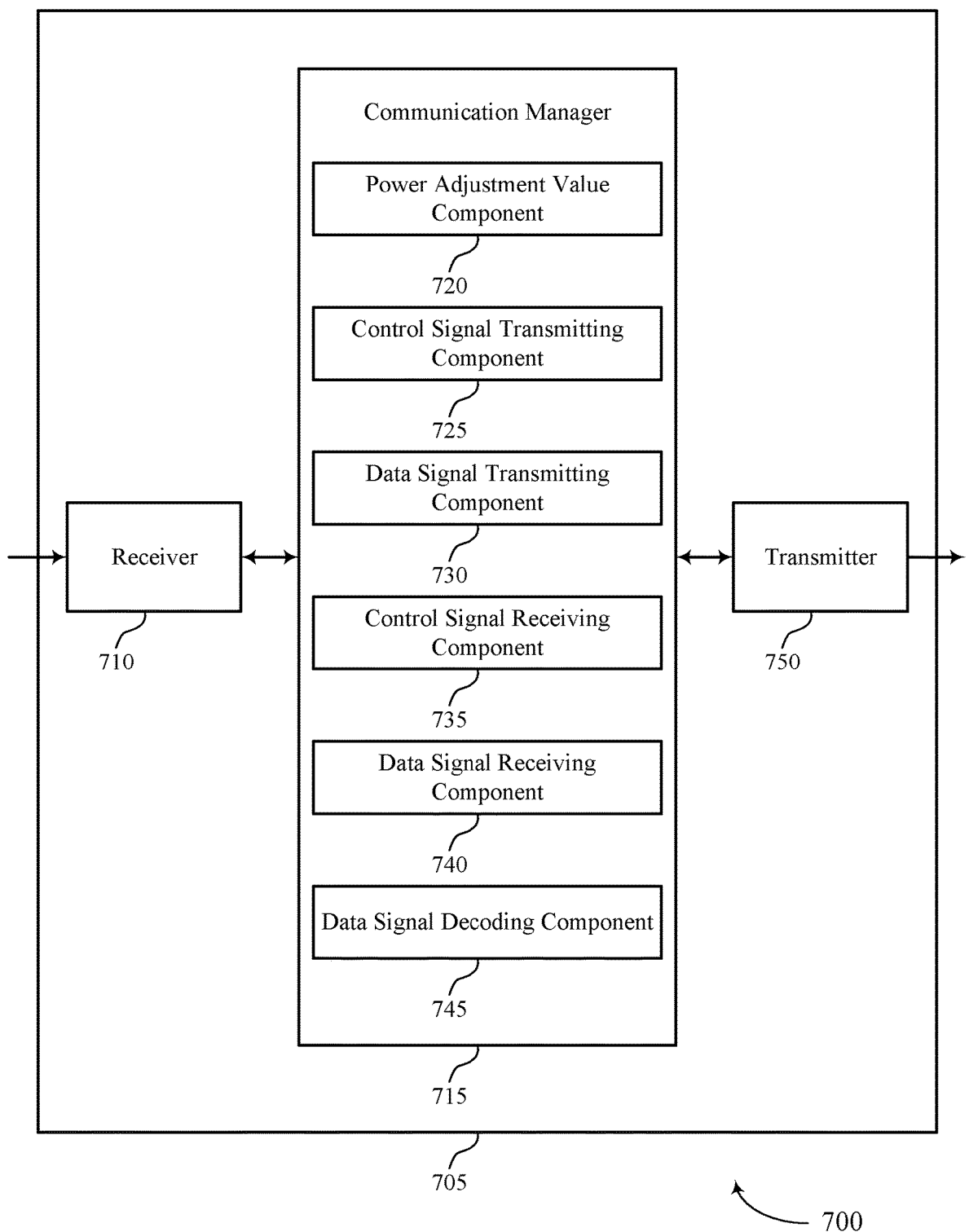

FIG. 7 shows a block diagram 700 of a device 705 that supports fast dynamic power control in accordance with aspects of the present disclosure. The device 705 may be an example of aspects of a device 605, a UE 115, or a base station 105 as described herein. The device 705 may include a receiver 710, a communication manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to fast dynamic power control, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include a power adjustment value component 720, a control signal transmitting component 725, a data signal transmitting component 730, a control signal receiving component 735, a data signal receiving component 740, and a data signal decoding component 745. The communication manager 715 may be an example of aspects of the communication manager 910 or 1010 as described herein.

The power adjustment value component 720 may determine a set of power adjustment values for a set of symbols to be used to transmit a data signal in a slot. The control signal transmitting component 725 may transmit a control signal indicating the set of power adjustment values. The data signal transmitting component 730 may transmit the data signal on the set of symbols in the slot based on applying the indicated set of power adjustment values to the set of symbols.

The control signal receiving component 735 may receive a control signal indicating a set of power adjustment values for a set of symbols to be used for a data signal in a slot. The data signal receiving component 740 may receive the data signal on the set of symbols in the slot. The data signal decoding component 745 may decode the received data signal based on applying the indicated set of power adjustment values to the set of symbols in the slot.

The transmitter 750 may transmit signals generated by other components of the device 705. In some examples, the transmitter 750 may be collocated with a receiver 710 in a transceiver module. For example, the transmitter 750 may be an example of aspects of the transceiver 915 described with reference to FIG. 9. The transmitter 750 may utilize a single antenna or a set of antennas.

Based on applying a per-symbol power adjustment for a transmission, a processor of a transmitting device (e.g., a UE 115 or a base station 105 controlling the receiver 710, the transmitter 750, a transceiver 915 as described with reference to FIG. 9 or a transceiver 1020 as described with reference to FIG. 10) may efficiently maintain a peak transmit power for the duration of a transmission. Further, the processor of transmitting device operate the components of the transmitting device to send an indication of the per-symbol power adjustments to a receiving device. A processor of the receiving device may then use the indication of the per-symbol power adjustments to decode the power adjusted signal for coherent decoding, which may improve performance for a receiver or transceiver of the receiving device or shorten a processing time for the processor of the receiving device to decode the signal.

In some cases, the power adjustment value component 720, control signal transmitting component 725, data signal transmitting component 730, control signal receiving component 735, data signal receiving component 740, and data signal decoding component 745 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the power adjustment value component 720, control signal transmitting component 725, data signal transmitting component 730, control signal receiving component 735, data signal receiving component 740, and data signal decoding component 745 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
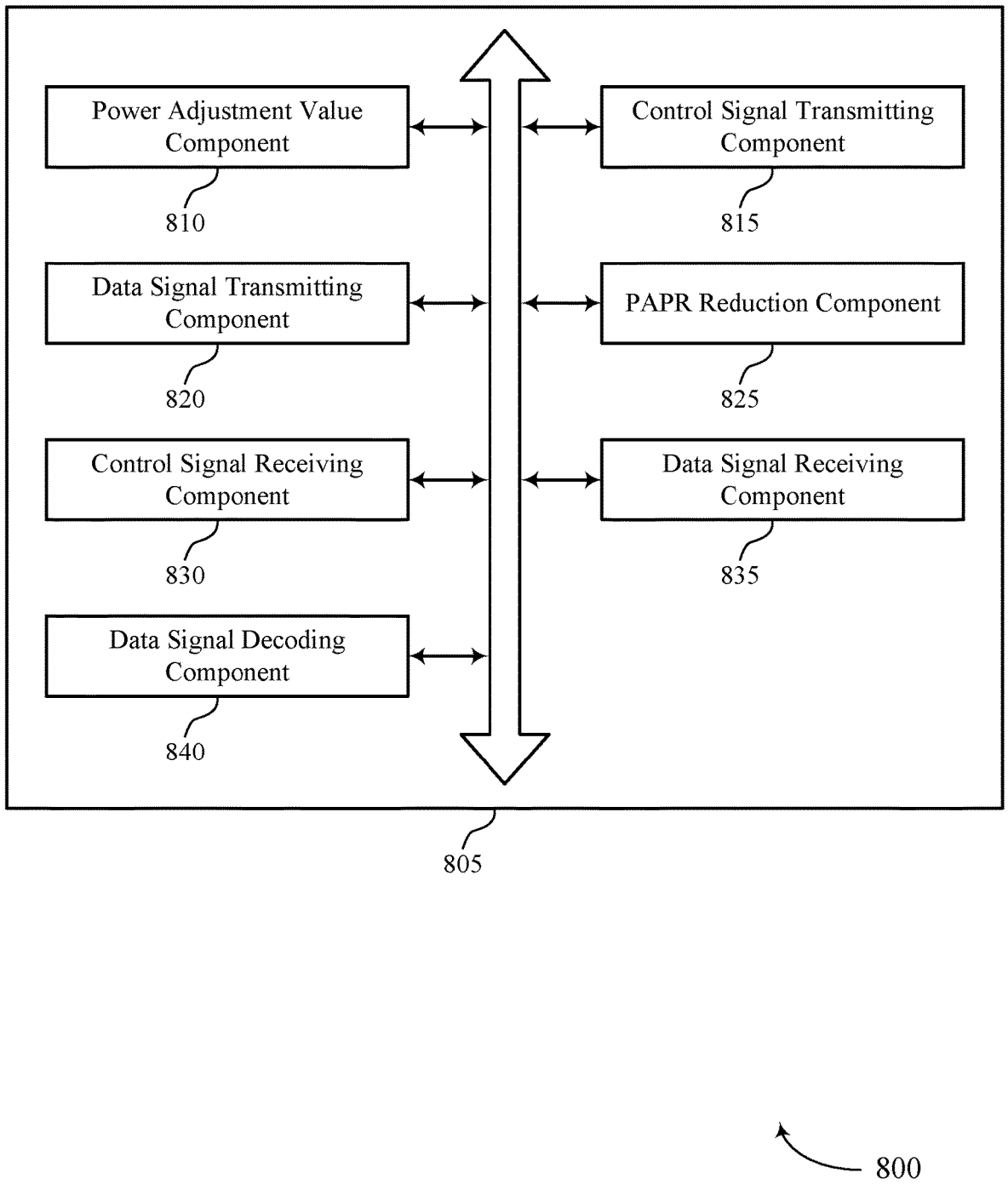
FIG. 8 shows a block diagram of a communication manager that supports fast dynamic power control in accordance with aspects of the present disclosure.

FIG. 8 shows a block diagram 800 of a communication manager 805 that supports fast dynamic power control in accordance with aspects of the present disclosure. The communication manager 805 may be an example of aspects of a communication manager 615, a communication manager 715, or a communication manager 910 described herein. The communication manager 805 may include a power adjustment value component 810, a control signal transmitting component 815, a data signal transmitting component 820, a PAPR reduction component 825, a control signal receiving component 830, a data signal receiving component 835, and a data signal decoding component 840. Each of these modules may communicate, directly or indirectly, with one another (e.g., via one or more buses).

The power adjustment value component 810 may determine a set of power adjustment values for a set of symbols to be used to transmit a data signal in a slot. In some examples, the power adjustment value component 810 may apply the indicated set of power adjustment values to the set of symbols to transmit the data signal at a maximum allowed peak power of the transmitting device. In some cases, each power adjustment value of the set of power adjustment values is based on a difference between a reference value and, for the data signal on a symbol of the set of symbols, a peak-to-average power value, a peak power, or an average power.

The control signal transmitting component 815 may transmit a control signal indicating the set of power adjustment values. In some examples, the control signal transmitting component 815 may transmit downlink control information indicating the set of power adjustment values. In some examples, the control signal transmitting component 815 may transmit uplink control information indicating the set of power adjustment values. In some cases, the downlink control information includes a grant of resources for the data signal.

The data signal transmitting component 820 may transmit the data signal on the set of symbols in the slot based on applying the indicated set of power adjustment values to the set of symbols.

The control signal receiving component 830 may receive a control signal indicating a set of power adjustment values for a set of symbols to be used for a data signal in a slot. In some examples, the control signal receiving component 830 may receive downlink control information indicating the set of power adjustment values. In some examples, the control signal receiving component 830 may receive uplink control information indicating the set of power adjustment values. In some cases, the downlink control information includes a grant of resources for the data signal. The PAPR reduction component 825 may combine the data signal with a peak-to-average power ratio reduction signal prior to transmitting the data signal.

The data signal receiving component 835 may receive the data signal on the set of symbols in the slot. The data signal decoding component 840 may decode the received data signal based on applying the indicated set of power adjustment values to the set of symbols in the slot. In some examples, the data signal decoding component 840 may apply the indicated set of power adjustment values to the set of symbols to decode the data signal at a maximum allowed peak power of the transmitting device.

In some cases, the power adjustment value component 810, control signal transmitting component 815, data signal transmitting component 820, PAPR reduction component 825, control signal receiving component 830, data signal receiving component 835, and data signal decoding component 840 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the power adjustment value component 810, control signal transmitting component 815, data signal transmitting component 820, PAPR reduction component 825, control signal receiving component 830, data signal receiving component 835, and data signal decoding component 840 discussed herein.

Figure 9:
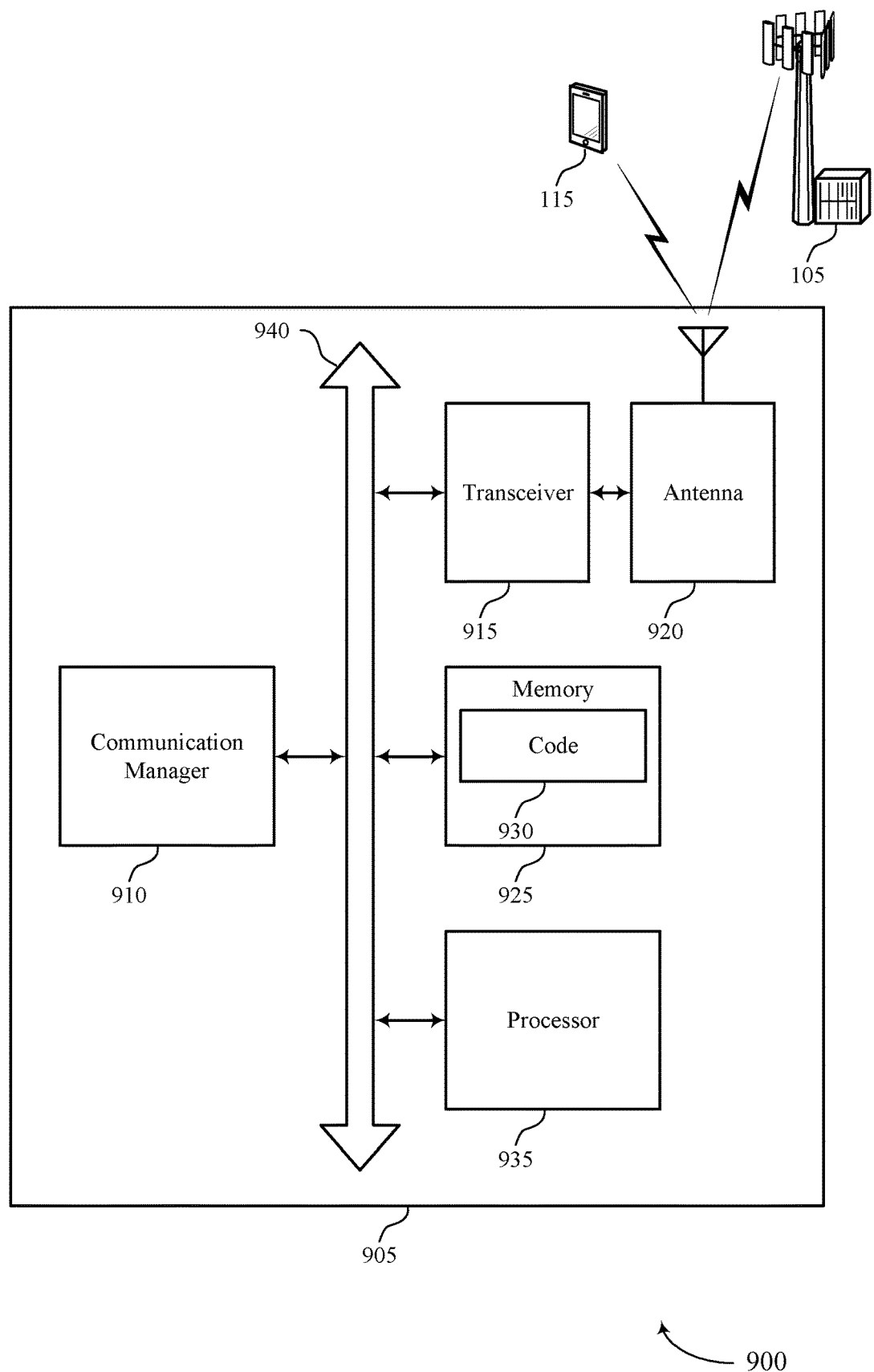
FIG. 9 shows a diagram of a system including a user equipment (UE) that supports fast dynamic power control in accordance with aspects of the present disclosure.

FIG. 9 shows a diagram of a system 900 including a device 905 that supports fast dynamic power control in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may determine a set of power adjustment values for a set of symbols to be used to transmit a data signal in a slot, transmit a control signal indicating the set of power adjustment values, and transmit the data signal on the set of symbols in the slot based on applying the indicated set of power adjustment values to the set of symbols. The communication manager 910 may also receive a control signal indicating a set of power adjustment values for a set of symbols to be used for a data signal in a slot, receive the data signal on the set of symbols in the slot, and decode the received data signal based on applying the indicated set of power adjustment values to the set of symbols in the slot.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting fast dynamic power control).

Figure 10:
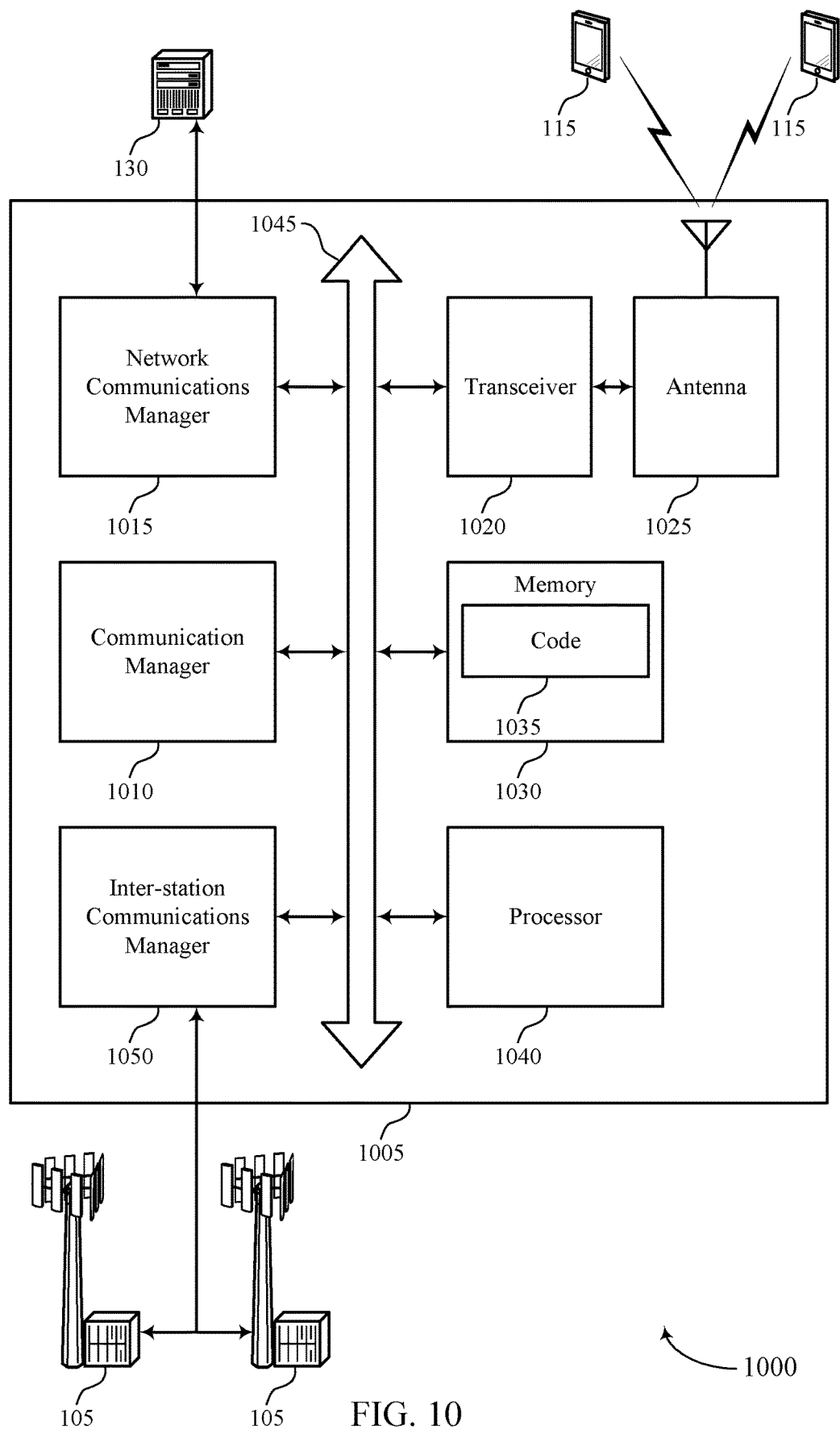
FIG. 10 shows a diagram of a system including a base station that supports fast dynamic power control in accordance with aspects of the present disclosure.

FIG. 10 shows a diagram of a system 1000 including a device 1005 that supports fast dynamic power control in accordance with aspects of the present disclosure. The device 1005 may be an example of or include the components of device 605, device 705, or a base station 105 as described herein. The device 1005 may include components for bi-directional voice and data communications including components for transmitting and receiving communications, including a communication manager 1010, a transceiver 1015, an antenna 1020, memory 1025, and a processor 1035. These components may be in electronic communication via one or more buses (e.g., bus 1040).

The communication manager 1010 may determine a set of power adjustment values for a set of symbols to be used to transmit a data signal in a slot, transmit a control signal indicating the set of power adjustment values, and transmit the data signal on the set of symbols in the slot based on applying the indicated set of power adjustment values to the set of symbols. The communication manager 1010 may also receive a control signal indicating a set of power adjustment values for a set of symbols to be used for a data signal in a slot, receive the data signal on the set of symbols in the slot, and decode the received data signal based on applying the indicated set of power adjustment values to the set of symbols in the slot.

The transceiver 1015 may communicate bi-directionally, via one or more antennas, wired, or wireless links as described above. For example, the transceiver 1015 may represent a wireless transceiver and may communicate bi-directionally with another wireless transceiver. The transceiver 1015 may also include a modem to modulate the packets and provide the modulated packets to the antennas for transmission, and to demodulate packets received from the antennas.

In some cases, the wireless device may include a single antenna 1020. However, in some cases the device may have more than one antenna 1020, which may be capable of concurrently transmitting or receiving multiple wireless transmissions.

The memory 1025 may include RAM and ROM. The memory 1025 may store computer-readable, computer-executable code 1030 including instructions that, when executed, cause the processor to perform various functions described herein. In some cases, the memory 1025 may contain, among other things, a BIOS which may control basic hardware or software operation such as the interaction with peripheral components or devices.

The code 1030 may include instructions to implement aspects of the present disclosure, including instructions to support wireless communications. The code 1030 may be stored in a non-transitory computer-readable medium such as system memory or other type of memory. In some cases, the code 1030 may not be directly executable by the processor 1035 but may cause a computer (e.g., when compiled and executed) to perform functions described herein.

The processor 1035 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1035 may be configured to operate a memory array using a memory controller. In other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting fast dynamic power control).

Figure 11:
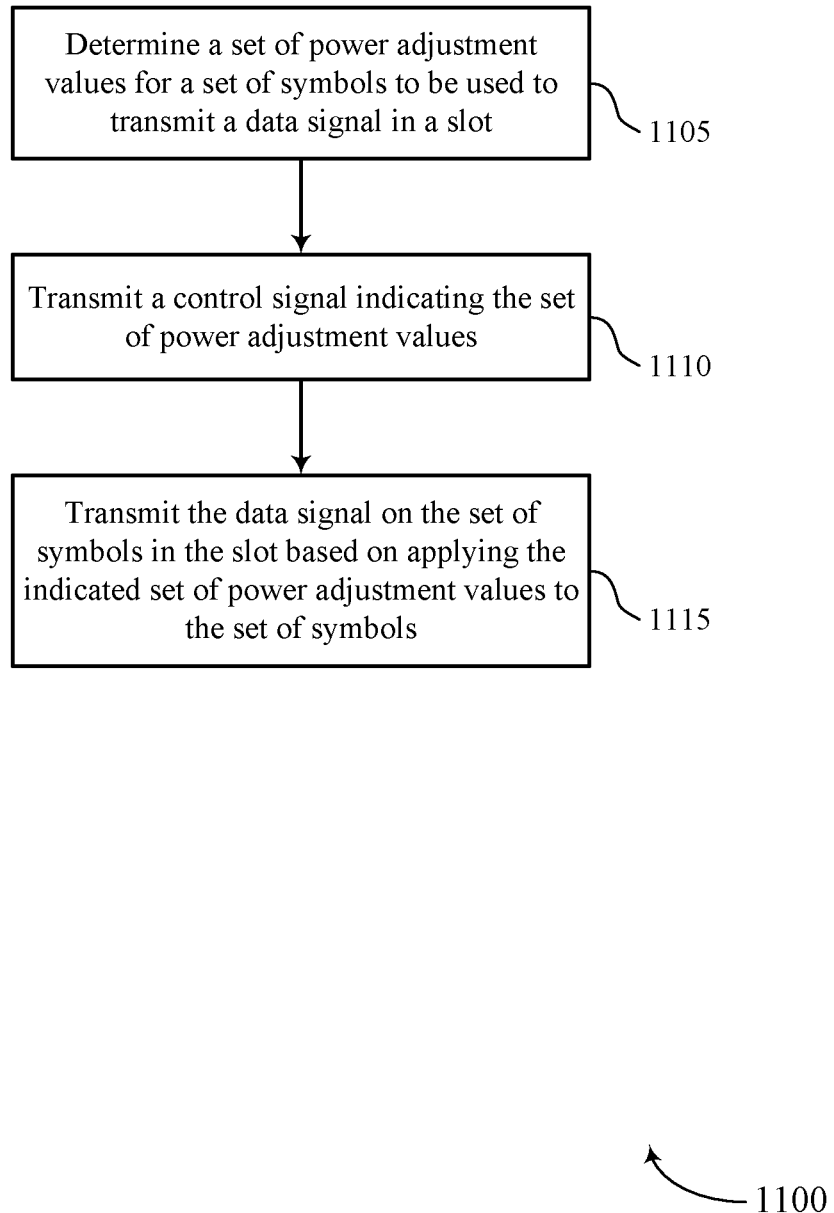
FIGS. 11 through 14 show flowcharts illustrating methods that support fast dynamic power control in accordance with aspects of the present disclosure.

FIG. 11 shows a flowchart illustrating a method 1100 that supports fast dynamic power control in accordance with aspects of the present disclosure. The operations of method 1100 may be implemented by a UE 115 or base station 105 or its components as described herein. For example, the operations of method 1100 may be performed by a communication manager as described with reference to FIGS. 6 through 10. In some examples, a UE or base station may execute a set of instructions to control the functional elements of the UE or base station to perform the described functions. Additionally or alternatively, a UE or base station may perform aspects of the described functions using special-purpose hardware.

At 1105, the UE or base station may determine a set of power adjustment values for a set of symbols to be used to transmit a data signal in a slot. The operations of 1105 may be performed according to the methods described herein. In some examples, aspects of the operations of 1105 may be performed by a power adjustment value component as described with reference to FIGS. 6 through 10.

At 1110, the UE or base station may transmit a control signal indicating the set of power adjustment values. The operations of 1110 may be performed according to the methods described herein. In some examples, aspects of the operations of 1110 may be performed by a control signal transmitting component as described with reference to FIGS. 6 through 10.

At 1115, the UE or base station may transmit the data signal on the set of symbols in the slot based on applying the indicated set of power adjustment values to the set of symbols. The operations of 1115 may be performed according to the methods described herein. In some examples, aspects of the operations of 1115 may be performed by a data signal transmitting component as described with reference to FIGS. 6 through 10.

Figure 12:
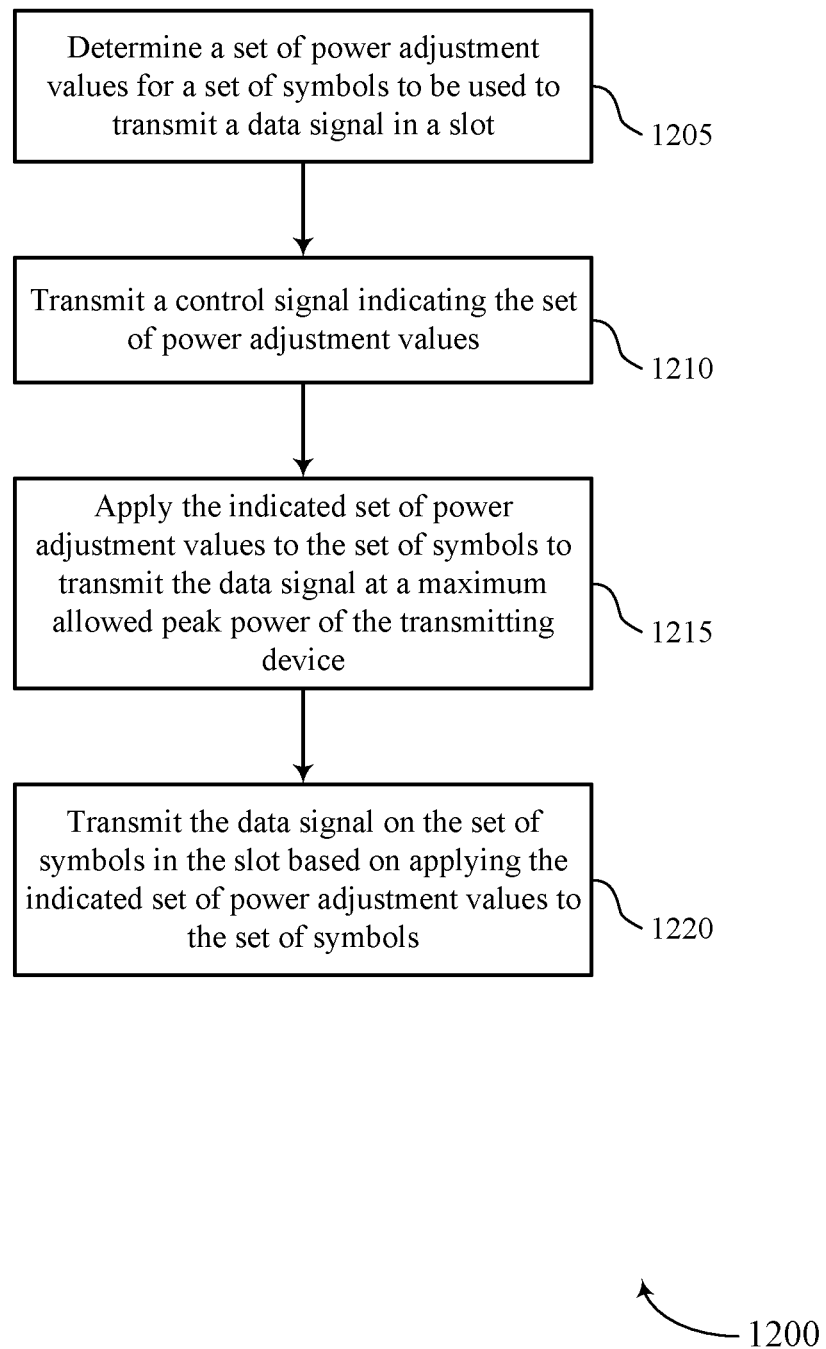

FIG. 12 shows a flowchart illustrating a method 1200 that supports fast dynamic power control in accordance with aspects of the present disclosure. The operations of method 1200 may be implemented by a UE 115 or base station 105 or its components as described herein. For example, the operations of method 1200 may be performed by a communication manager as described with reference to FIGS. 6 through 10. In some examples, a UE or base station may execute a set of instructions to control the functional elements of the UE or base station to perform the described functions. Additionally or alternatively, a UE or base station may perform aspects of the described functions using special-purpose hardware.

At 1205, the UE or base station may determine a set of power adjustment values for a set of symbols to be used to transmit a data signal in a slot. The operations of 1205 may be performed according to the methods described herein. In some examples, aspects of the operations of 1205 may be performed by a power adjustment value component as described with reference to FIGS. 6 through 10.

At 1210, the UE or base station may transmit a control signal indicating the set of power adjustment values. The operations of 1210 may be performed according to the methods described herein. In some examples, aspects of the operations of 1210 may be performed by a control signal transmitting component as described with reference to FIGS. 6 through 10.

At 1215, the UE or base station may apply the indicated set of power adjustment values to the set of symbols to transmit the data signal at a maximum allowed peak power of the transmitting device. The operations of 1215 may be performed according to the methods described herein. In some examples, aspects of the operations of 1215 may be performed by a power adjustment value component as described with reference to FIGS. 6 through 10.

At 1220, the UE or base station may transmit the data signal on the set of symbols in the slot based on applying the indicated set of power adjustment values to the set of symbols. The operations of 1220 may be performed according to the methods described herein. In some examples, aspects of the operations of 1220 may be performed by a data signal transmitting component as described with reference to FIGS. 6 through 10.

Figure 13:
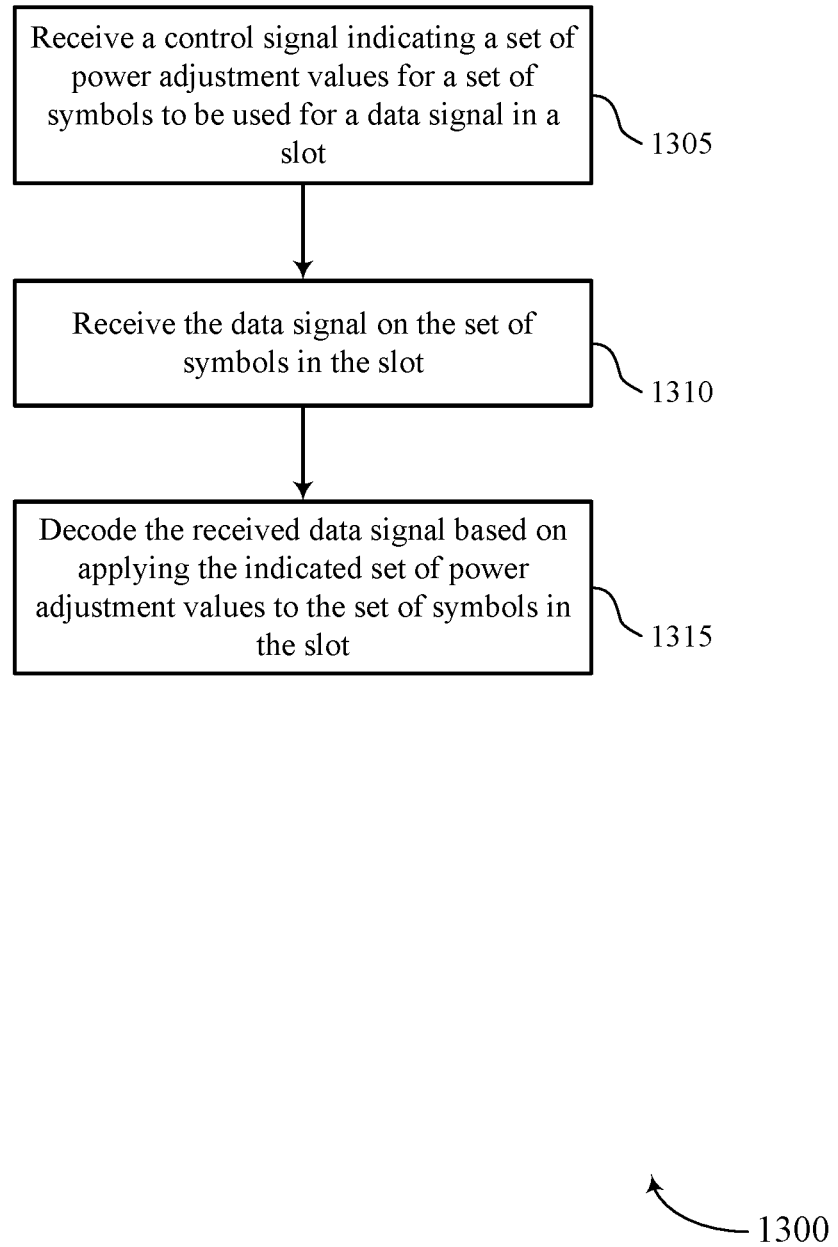

FIG. 13 shows a flowchart illustrating a method 1300 that supports fast dynamic power control in accordance with aspects of the present disclosure. The operations of method 1300 may be implemented by a UE 115 or base station 105 or its components as described herein. For example, the operations of method 1300 may be performed by a communication manager as described with reference to FIGS. 6 through 10. In some examples, a UE or base station may execute a set of instructions to control the functional elements of the UE or base station to perform the described functions. Additionally or alternatively, a UE or base station may perform aspects of the described functions using special-purpose hardware.

At 1305, the UE or base station may receive a control signal indicating a set of power adjustment values for a set of symbols to be used for a data signal in a slot. The operations of 1305 may be performed according to the methods described herein. In some examples, aspects of the operations of 1305 may be performed by a control signal receiving component as described with reference to FIGS. 6 through 10.

At 1310, the UE or base station may receive the data signal on the set of symbols in the slot. The operations of 1310 may be performed according to the methods described herein. In some examples, aspects of the operations of 1310 may be performed by a data signal receiving component as described with reference to FIGS. 6 through 10.

At 1315, the UE or base station may decode the received data signal based on applying the indicated set of power adjustment values to the set of symbols in the slot. The operations of 1315 may be performed according to the methods described herein. In some examples, aspects of the operations of 1315 may be performed by a data signal decoding component as described with reference to FIGS. 6 through 10.

Figure 14:
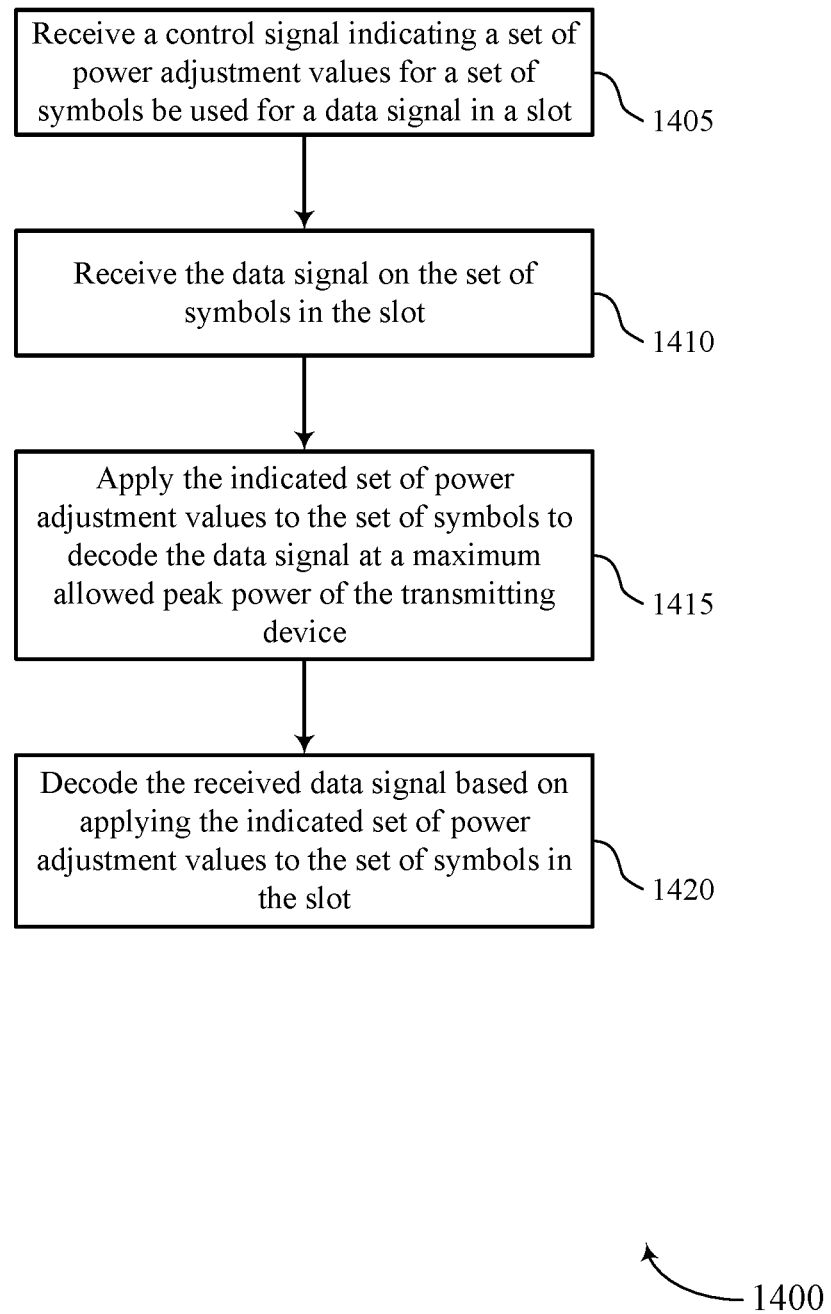

FIG. 14 shows a flowchart illustrating a method 1400 that supports fast dynamic power control in accordance with aspects of the present disclosure. The operations of method 1400 may be implemented by a UE 115 or base station 105 or its components as described herein. For example, the operations of method 1400 may be performed by a communication manager as described with reference to FIGS. 6 through 10. In some examples, a UE or base station may execute a set of instructions to control the functional elements of the UE or base station to perform the described functions. Additionally or alternatively, a UE or base station may perform aspects of the described functions using special-purpose hardware.

At 1405, the UE or base station may receive a control signal indicating a set of power adjustment values for a set of symbols to be used for a data signal in a slot. The operations of 1405 may be performed according to the methods described herein. In some examples, aspects of the operations of 1405 may be performed by a control signal receiving component as described with reference to FIGS. 6 through 10.

At 1410, the UE or base station may receive the data signal on the set of symbols in the slot. The operations of 1410 may be performed according to the methods described herein. In some examples, aspects of the operations of 1410 may be performed by a data signal receiving component as described with reference to FIGS. 6 through 10.

At 1415, the UE or base station may apply the indicated set of power adjustment values to the set of symbols to decode the data signal at a maximum allowed peak power of the transmitting device. The operations of 1415 may be performed according to the methods described herein. In some examples, aspects of the operations of 1415 may be performed by a data signal decoding component as described with reference to FIGS. 6 through 10.

At 1420, the UE or base station may decode the received data signal based on applying the indicated set of power adjustment values to the set of symbols in the slot. The operations of 1420 may be performed according to the methods described herein. In some examples, aspects of the operations of 1420 may be performed by a data signal decoding component as described with reference to FIGS. 6 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a transmitting device, comprising: determining a set of power adjustment values for a set of symbols to be used to transmit a data signal in a slot; transmitting a control signal indicating the set of power adjustment values; and transmitting the data signal on the set of symbols in the slot based at least in part on applying the indicated set of power adjustment values to the set of symbols.

Aspect 2: The method of aspect 1, wherein transmitting the control signal further comprises: transmitting downlink control information indicating the set of power adjustment values.

Aspect 3: The method of aspect 2, wherein the downlink control information comprises a grant of resources for the data signal.

Aspect 4: The method of any of aspects 1 through 3, wherein transmitting the control signal further comprises: transmitting uplink control information indicating the set of power adjustment values.

Aspect 5: The method of any of aspects 1 through 4, wherein each one power adjustment value of the set of power adjustment values corresponds to a power adjustment to be applied to a respective one symbol of the set of symbols in the slot.

Aspect 6: The method of any of aspects 1 through 4, wherein each one power adjustment value of the set of power adjustment values corresponds to a power adjustment to be applied to a respective subset of symbols of the set of symbols in the slot.

Aspect 7: The method of any of aspects 1 through 6, further comprising: each power adjustment value of the set of power adjustment values is based at least in part on a difference between a reference value and, for the data signal on a symbol of the set of symbols, a peak-to-average power value, a peak power, or an average power.

Aspect 8: The method of aspect 7, wherein the reference value is a maximum peak-to-average power value of the slot, a maximum peak power of the slot, or a maximum average power of the slot.

Aspect 9: The method of any of aspects 7 through 8, wherein the reference value is based at least in part on a transmit power saturation value associated with one or more power amplifiers of the transmitting device.

Aspect 10: The method of any of aspects 1 through 9, wherein transmitting the data signal further comprises: applying the indicated set of power adjustment values to the set of symbols to transmit the data signal at a maximum allowed peak power of the transmitting device.

Aspect 11: The method of any of aspects 1 through 10, further comprising: combining the data signal with a peak-to-average power ratio reduction signal prior to transmitting the data signal.

Aspect 12: The method of any of aspects 1 through 11, wherein the transmitting device is a UE or a base station.

Aspect 13: A method for wireless communication at a receiving device, comprising: receiving a control signal indicating a set of power adjustment values for a set of symbols to be used for a data signal in a slot; receiving the data signal on the set of symbols in the slot; and decoding the received data signal based at least in part on applying the indicated set of power adjustment values to the set of symbols in the slot.

Aspect 14: The method of aspect 13, wherein receiving the control signal further comprises: receiving downlink control information indicating the set of power adjustment values.

Aspect 15: The method of aspect 14, wherein the downlink control information comprises a grant of resources for the data signal.

Aspect 16: The method of any of aspects 13 through 15, wherein receiving the control signal further comprises: receiving uplink control information indicating the set of power adjustment values.

Aspect 17: The method of any of aspects 13 through 16, wherein each one power adjustment value of the set of power adjustment values corresponds to a power adjustment to be applied when decoding a respective one symbol of the set of symbols in the slot.

Aspect 18: The method of any of aspects 13 through 16, wherein each one power adjustment value of the set of power adjustment values corresponds to a power adjustment to be applied when decoding a respective subset of symbols of the set of symbols in the slot.

Aspect 19: The method of any of aspects 13 through 18, wherein each power adjustment value of the set of power adjustment values is based at least in part on a difference between a reference value and, for the data signal on a symbol of the set of symbols, a peak-to-average power value, a peak power, or an average power.

Aspect 20: The method of aspect 19, wherein the reference value is a maximum peak-to-average power value of the slot, a maximum peak power of the slot, or a maximum average power of the slot.

Aspect 21: The method of any of aspects 19 through 20, wherein the reference value is based at least in part on a transmit power saturation value associated with one or more power amplifiers of the transmitting device.

Aspect 22: The method of any of aspects 13 through 21, wherein receiving the data signal further comprises: applying the indicated set of power adjustment values to the set of symbols to decode the data signal at a maximum allowed peak power of the transmitting device.

Aspect 23: The method of any of aspects 13 through 22, wherein the data signal is decoded based at least in part on the data signal being combined with a peak-to-average power ratio reduction signal.

Aspect 24: The method of any of aspects 13 through 23, wherein the receiving device is a UE or a base station.

Aspect 25: An apparatus for wireless communication at a transmitting device, comprising a processor; memory coupled with the processor; and instructions stored in the memory and executable by the processor to cause the apparatus to perform a method of any of aspects 1 through 12.

Aspect 26: An apparatus for wireless communication at a transmitting device, comprising at least one means for performing a method of any of aspects 1 through 12.

Aspect 27: A non-transitory computer-readable medium storing code for wireless communication at a transmitting device, the code comprising instructions executable by a processor to perform a method of any of aspects 1 through 12.

Aspect 28: An apparatus for wireless communication at a receiving device, comprising a processor; memory coupled with the processor; and instructions stored in the memory and executable by the processor to cause the apparatus to perform a method of any of aspects 13 through 24.

Aspect 29: An apparatus for wireless communication at a receiving device, comprising at least one means for performing a method of any of aspects 13 through 24.

Aspect 30: A non-transitory computer-readable medium storing code for wireless communication at a receiving device, the code comprising instructions executable by a processor to perform a method of any of aspects 13 through 24.

Techniques described herein may be used for various wireless communications systems such as code division multiple access (CDMA), time division multiple access (TDMA), frequency division multiple access (FDMA), orthogonal FDMA (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a transmitting device, comprising:
 determining a set of power adjustment values for a set of symbols to be used to transmit a data signal in a slot, wherein each power adjustment value of the set of power adjustment values is based at least in part on a difference between a reference value and, for the data signal on a symbol of the set of symbols, a peak-to-average power value, a peak power, or an average power, or any combination thereof;
 transmitting a control signal indicating the set of power adjustment values; and
 transmitting the data signal on the set of symbols in the slot based at least in part on applying the indicated set of power adjustment values to the set of symbols.

2. The method of claim 1, wherein transmitting the control signal further comprises:
 transmitting downlink control information indicating the set of power adjustment values.

3. The method of claim 2, wherein the downlink control information comprises a grant of resources for the data signal.

4. The method of claim 1, wherein transmitting the control signal further comprises:
 transmitting uplink control information indicating the set of power adjustment values.

5. The method of claim 1, wherein each one power adjustment value of the set of power adjustment values corresponds to a power adjustment to be applied to a respective one symbol of the set of symbols in the slot.

6. The method of claim 1, wherein each one power adjustment value of the set of power adjustment values corresponds to a power adjustment to be applied to a respective subset of symbols of the set of symbols in the slot.

7. The method of claim 1, wherein the reference value is a maximum peak-to-average power value of the slot, a maximum peak power of the slot, or a maximum average power of the slot.

8. The method of claim 1, wherein the reference value is based at least in part on a transmit power saturation value associated with one or more power amplifiers of the transmitting device.

9. The method of claim 1, wherein transmitting the data signal further comprises:
 applying the indicated set of power adjustment values to the set of symbols to transmit the data signal at a maximum allowed peak power of the transmitting device.

10. The method of claim 1, further comprising:
 combining the data signal with a peak-to-average power ratio reduction signal prior to transmitting the data signal.

11. A method for wireless communication at a receiving device, comprising:
 receiving a control signal indicating a set of power adjustment values for a set of symbols to be used for a data signal in a slot, wherein each power adjustment value of the set of power adjustment values is based at least in part on a difference between a reference value and, for the data signal on a symbol of the set of symbols, a peak-to-average power value, a peak power, or an average power, or any combination thereof;
 receiving the data signal on the set of symbols in the slot; and
 decoding the received data signal based at least in part on applying the indicated set of power adjustment values to the set of symbols in the slot.

12. The method of claim 11, wherein receiving the control signal further comprises:
 receiving downlink control information indicating the set of power adjustment values.

13. The method of claim 12, wherein the downlink control information comprises a grant of resources for the data signal.

14. The method of claim 11, wherein receiving the control signal further comprises:
 receiving uplink control information indicating the set of power adjustment values.

15. The method of claim 11, wherein each one power adjustment value of the set of power adjustment values corresponds to a power adjustment to be applied when decoding a respective one symbol of the set of symbols in the slot.

16. The method of claim 11, wherein each one power adjustment value of the set of power adjustment values corresponds to a power adjustment to be applied when decoding a respective subset of symbols of the set of symbols in the slot.

17. The method of claim 11, wherein the reference value is a maximum peak-to-average power value of the slot, a maximum peak power of the slot, or a maximum average power of the slot.

18. The method of claim 11, wherein the reference value is based at least in part on a transmit power saturation value associated with one or more power amplifiers of a transmitting device.

19. The method of claim 11, wherein receiving the data signal further comprises:
 applying the indicated set of power adjustment values to the set of symbols to decode the data signal at a maximum allowed peak power of a transmitting device.

20. The method of claim 11, wherein the data signal is decoded based at least in part on the data signal being combined with a peak-to-average power ratio reduction signal.

21. An apparatus for wireless communication at a transmitting device, comprising:
 a processor,
 memory coupled with the processor, and
 instructions stored in the memory and executable by the processor to cause the apparatus to:
  determine a set of power adjustment values for a set of symbols to be used to transmit a data signal in a slot, wherein each power adjustment value of the set of power adjustment values is based at least in part on a difference between a reference value and, for the data signal on a symbol of the set of symbols, a peak-to-average power value, a peak power, or an average power, or any combination thereof;
  transmit a control signal indicating the set of power adjustment values; and
  transmit the data signal on the set of symbols in the slot based at least in part on applying the indicated set of power adjustment values to the set of symbols.

22. The apparatus of claim 21, wherein the instructions are further executable by the processor to cause the apparatus to:
 transmit downlink control information or uplink control information indicating the set of power adjustment values.

23. The apparatus of claim 21, wherein each one power adjustment value of the set of power adjustment values corresponds to a power adjustment to be applied to a respective one symbol of the set of symbols in the slot or a respective subset of symbols of the set of symbols in the slot.

24. The apparatus of claim 21, wherein the instructions are further executable by the processor to cause the apparatus to:
apply the indicated set of power adjustment values to the set of symbols to transmit the data signal at a maximum allowed peak power of the transmitting device.

25. The apparatus of claim 21, wherein the instructions are further executable by the processor to cause the apparatus to:
combine the data signal with a peak-to-average power ratio reduction signal prior to transmitting the data signal.

26. An apparatus for wireless communication at a receiving device, comprising:
a processor,
memory coupled with the processor, and
instructions stored in the memory and executable by the processor to cause the apparatus to:
receive a control signal indicating a set of power adjustment values for a set of symbols to be used for a data signal in a slot, wherein each power adjustment value of the set of power adjustment values is based at least in part on a difference between a reference value and, for the data signal on a symbol of the set of symbols, a peak-to-average power value, a peak power, or an average power, or any combination thereof;
receive the data signal on the set of symbols in the slot; and
decode the received data signal based at least in part on applying the indicated set of power adjustment values to the set of symbols in the slot.

27. The apparatus of claim 26, wherein the instructions are further executable by the processor to cause the apparatus to:
receive downlink control information or uplink control information indicating the set of power adjustment values.

* * * * *